BEST AVAILABLE COPY BEST AVAILABLE COPY
D. N. B. Coffin, Jr. & I. D. Spaulding,
Capstan.
No. 2,559. Reissued Apr. 16, 1867.
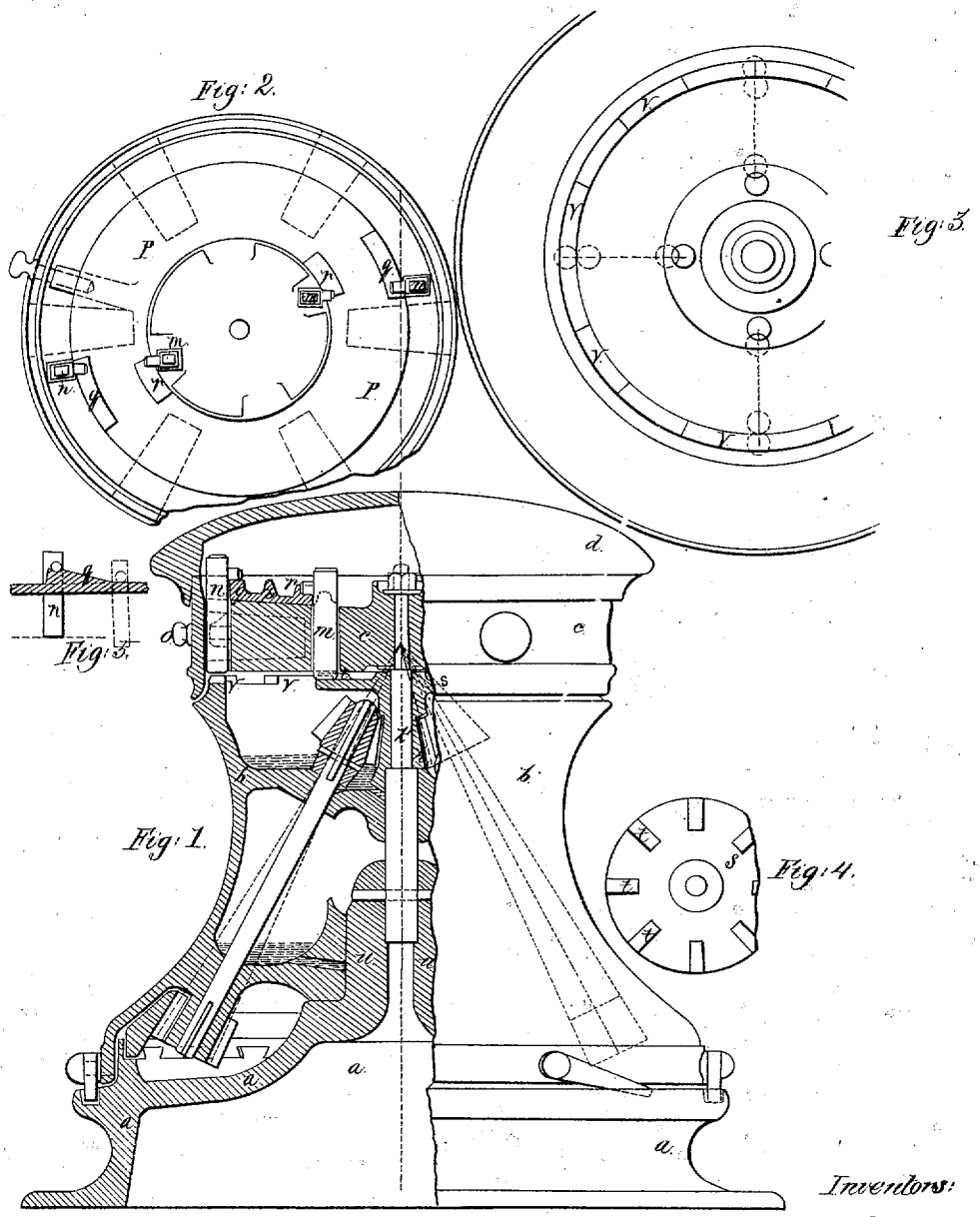
Witnesses:
E. H. Coffin
Lorenzo G. Moulton
Inventors:
D. N. B. Coffin Jr.
Isaac D. Spaulding
A.M. PHOTO-LITHO. CO. N.Y. (OSBORNE'S PROCESS.)

United States Patent Office.

DAVID N. B. COFFIN, JR., AND IRAH D. SPAULDING, OF BOSTON, MASSACHUSETTS, ASSIGNEES OF D. N. B. COFFIN, JR.

DIVISION II.

*Letters Patent No.* 51,107, *dated November* 21, 1865; *reissue No.* 2,559, *dated April* 16, 1867.

IMPROVED POWER CAPSTAN.

The Schedule referred to in these Letters Patent and making part of the same.

TO ALL WHOM IT MAY CONCERN:

Be it known that DAVID N. B. COFFIN, Jr., of Boston, in the county of Suffolk, and Brookline, in the county of Norfolk, did invent certain new and useful Improvements in Capstans, of which the following is a full and exact description, conforming to the drawings which comprised a part of his original application and patent, reference being had to the accompanying copy of the original drawings and unimportant added illustration. Like letters refer to the same or corresponding parts in the drawings.

Figure 1 is a sectional elevation of a capstan.

Figure 2 is a plan of the lever-head.

Figure 3 is a plan of the capstan barrel or windlass.

Figure 4 is a plan of a clutch or flange with lugs cast in one piece with or otherwise fastened to gear *h*.

Figure 5 is a view of an inclined or wedge-shaped lifter and a sliding bolt to slide vertically or otherwise from the position shown by dotted lines to the one represented in full lines.

A is the bed-plate; this plate is cast hollow beneath, and in one piece with the lower portion of the spindle which forms the journal for the barrel *b*. This lower journal part of the spindle is, as well as the bed-plate, also cast hollow. As the main strain of the capstan comes upon this lower journal part of the spindle the advantage of casting large, hollow for lightness and successful casting, and directly upon the bed-plate, and as a part of it, will be apparent without further explanation. The upper portion of the spindle may be of any desirable construction. The best, however, which I will proceed to describe, is to make it of wrought metal and cast the lower part on it or insert it aftert he lower part *u* is made by boring and turning; in which latter case it may be secured by a pin as shown, or by riveting the lower end, or in any other of the processes well known to the art for similar cases. The bed-plate, so far as relates to its other features, will be sufficiently understood from the drawings. Another feature of the invention relates to the mechanism for locking together and unlocking the different parts of a capstan. *c* is the lever-head, and *h* is the centre gear which is to be driven when the capstan is used as a power capstan. *b* is the capstan or windlass barrel, and is driven directly by means of lugs V on its end when the simple power is required. The lever-head *c* is furnished with the sliding bolts *n* and *m*. The gear *h* is furnished with flange S, having lugs *t*, cast on or otherwise formed, so as to furnish a holding place for bolts *m*. For the purpose of operating the bolts *n* and *m* the inclined or wedge-shaped lifters *q* and *r* are provided. (Observe fig. 5.) If the lifter *q* is moved to the right it will act on the projecting part of the bolt in dotted lines, and move it from the base of the lifter till it stands at the elevated part of the lifter as shown in full lines. On moving the lifter in the opposite direction the bolt is free to slide by its own gravity, or other force applied, to the position shown by the dotted lines with reference to the lifter. A ring, *p*, guided by suitable bearings in the lever-head *c*, has two series of these inclined lifters fixed or cast on it, (*q* and *r*.) The inclines *r* incline in the opposite direction from the inclines *q*. When the ring is rotated partially in one direction, one set of the inclines lifts bolts *n*, the other allowing bolts *m* to slide into action and lock gear *h* to the lever-head. When the ring *p* is moved in the opposite direction the inclines *r* lift the bolts *m* from connection with lugs *t* on the plate S attached to gear *h*, and inclines *q* allow the bolts *n* to slide into connection with lugs *v* on the capstan barrel. The latter movement locks the lever-head to the barrel of the capstan or windlass for simple power, and the former locks the centre gear to the lever-head for power multiplied. The ring *p* is moved by means of a projecting part, *o*. The bolts and lifters, with their ring or circular connection, may all be of cast iron or other suitable material.

Having described the invention, what we claim, and desire to secure by Letters Patent, is as follows:

1. The inclined or wedge-shaped lifter *q*, made movable separately from the parts to be locked together, in combination with the sliding bolts of a capstan, substantially as described.

2. The arrangement of one or more series of inclined or wedge-shaped lifters upon a ring or circular connection *p*, so as to operate simultaneously on several bolts in the locking mechanism of a capstan, substantially as described.

3. Casting the lower journal part of the spindle or shaft of a capstan on and as a part of the bed-plate.

4. Casting the lower journal part of the spindle or shaft of a capstan hollow, in combination with its formation on and as a part of the bed-plate, irrespective of the construction of the upper portion.

5. Compounding the spindle or shaft of a capstan, by forming the lower journal part on and as part of the bed-plate, and inserting the comparatively lighter wrought part to form the upper portion, substantially as described.

D. N. B. COFFIN, JR.
IRAH D. SPAULDING.

Witnesses:
E. H. COFFIN,
LORENZO G. MOULTON.